United States Patent
Jindal et al.

(10) Patent No.: US 12,536,128 B1
(45) Date of Patent: Jan. 27, 2026

(54) DEVICE, SYSTEM, AND METHOD FOR HARDWARE SMALL COMPUTER SYSTEM INTERFACE

(71) Applicants: Mohan Kumar Jindal, Bangalore (IN); Shailja Jindal, Bangalore (IN)

(72) Inventors: Mohan Kumar Jindal, Bangalore (IN); Srirama Chandra Murthy Pratapa, Bangalore (IN); Ashish Shridhar Jadhao, Bangalore (IN); Sumit Manoj Kavathekar, Bangalore (IN); Shon Pravin Taware, Bangalore (IN); Ravindra Madan Lande, Bangalore (IN); Sesha Sowjanya Battula, Bangalore (IN); Jaspritam Singh, Bangalore (IN); Akanksha Kishor Bedekar, Bangalore (IN); Pratiksha Ishwar Jondhale, Bangalore (IN)

(73) Assignees: Mohan Kumar Jindal, Bangalore (IN); Shailja Jindal, Bangalore (IN)

( * ) Notice: Subject to any disclaimer, the term of this patent is extended or adjusted under 35 U.S.C. 154(b) by 0 days.

(21) Appl. No.: 18/652,830

(22) Filed: May 2, 2024

Related U.S. Application Data

(63) Continuation-in-part of application No. PCT/IN2024/050106, filed on Feb. 3, 2024.

(51) Int. Cl.
*G06F 13/42* (2006.01)

(52) U.S. Cl.
CPC .. *G06F 13/4282* (2013.01); *G06F 2213/0036* (2013.01)

(58) Field of Classification Search
None
See application file for complete search history.

(56) References Cited

U.S. PATENT DOCUMENTS

| | | | |
|---|---|---|---|
| 5,822,614 A * | 10/1998 | Kenton | G06F 9/4411 710/62 |
| 9,172,586 B1 * | 10/2015 | Shah | H04L 67/568 |
| 2010/0198781 A1 * | 8/2010 | Yuine | G05B 19/052 707/609 |
| 2011/0258304 A1 * | 10/2011 | Fukushima | H04L 67/14 709/223 |
| 2020/0379668 A1 * | 12/2020 | Akaike | G06F 3/067 |

\* cited by examiner

*Primary Examiner* — Henry Tsai
*Assistant Examiner* — Dean Phan
(74) *Attorney, Agent, or Firm* — Jose Cherson Weissbrot

(57) ABSTRACT

Disclosed is a small computer-system interface (SCSI) device (102) including an initialization unit (110) and a control unit (112), implemented on at least one of, a Field Programmable Gate Array (FPGA) and Application Specific Integrated Circuits (ASICs). The query unit (110) sends a first signal to a slave controller (104), receives, from the Slave controller (104), first information of a peripheral device (106), in response to the first signal, receives second information from the master controller (108). The control unit (112) generates a plurality of command descriptor blocks (CDBs) based on the first information and the second information, and sends the plurality of CDBs to the slave controller (104) for a transfer of data between the master controller (108) and the peripheral device (106), receives the data from the slave controller (104) and send the data to the master controller (108).

9 Claims, 3 Drawing Sheets

DEVICE, SYSTEM, AND METHOD FOR HARDWARE SMALL COMPUTER SYSTEM INTERFACE

TECHNICAL FIELD

The present disclosure relates generally to hardware based electronic circuits. More particularly, the present disclosure relates to a device, a system, and a method for hardware small computer system interface.

BACKGROUND

Data transfer between two devices (i.e., a host device and a guest device) requires both the devices (i.e., the host device and the guest device) to be configured to communicate with each other and transfer commands, requests, instructions, status and data. The interface that enables connections and data transfer between the two devices (i.e., the host device and the guest device) is commonly known as a small computer system interface (SCSI).

The performance of the SCSI depends on the processing capability of a general-purpose processor of the host device, which is utilized by a number of other tasks being performed in the host device. Further, as the SCSI is commonly software driven, it is prone to a number of challenges such as a number of failures, malware attacks, unoptimized or slow processing resulting in slow or no data transfer, and the like.

Thus, a secure interface to establish connections and data communication between two or more devices, with a dedicated functionality is an ongoing effort, and demands a need for improvised technical solution that overcomes the aforementioned problems.

SUMMARY

In an aspect of the present disclosure, a small computer-system interface (SCSI) device includes an initialization unit, and a control unit coupled to each other. The initialization unit and the control unit are implemented on at least one of, a Field Programmable Gate Array (FPGA) and Application Specific Integrated Circuits (ASICs). The initialization unit is configured to send a first signal to a slave controller.

The initialization unit is further configured to receive from the slave controller, first information of a peripheral device in response to the first signal. Furthermore, the initialization unit is configured to receive second information from the master controller. The control unit is configured to generate a plurality of command descriptor blocks (CDBs) based on the first information and the second information. The control unit is further configured to send the plurality of CDBs to the slave controller for a transfer of data between the master controller and the peripheral device. Furthermore, the control unit is configured to transfer the data between the master controller and the peripheral device.

In some aspects, the first information includes a status of a connection of the peripheral device with the slave controller, a block size of the peripheral device, and specifications of the peripheral device.

In some aspects, the second information includes a direction of transfer of the data, a logical bit address of the master controller, and a size of data to be transferred.

In some aspects, the direction of the transfer of the data includes a first direction and a second direction.

In some aspects, the plurality of CDBs include a plurality of read CDBs and a plurality of write CDBs.

In some aspects, the control unit is configured to generate the plurality of read CDBs and the plurality of write CDBs when the direction of the transfer of the data is the first direction and the second direction, respectively.

In another aspect of the present disclosure, a system includes a slave controller and a small computer system interface (SCSI) device. The SCSI device includes an initialization unit, and a control unit coupled to each other. The initialization unit and the control unit are implemented on at least one of, a Field Programmable Gate Array (FPGA) and Application Specific Integrated Circuits (ASICs). The initialization unit is configured to send a first signal to the slave controller. The initialization unit is further configured to receive from the slave controller, first information of a peripheral device in response to the first signal. Furthermore, the initialization unit is configured to receive second information from the master controller. The control unit is configured to generate a plurality of command descriptor blocks (CDBs) based on the first information and the second information. The control unit is further configured to send the plurality of CDBs to the slave controller for a transfer of data between the master controller and the peripheral device. Furthermore, the control unit is configured to transfer the data between the master controller and the peripheral device.

In another aspect of the present disclosure, a method includes sending, by way of a small computer system interface (SCSI) device, a first signal to a slave controller. The method further includes receiving, by way of the SCSI device, first information of a peripheral device from the slave controller. Furthermore, the method includes receiving, by way of the SCSI device, second information from the master controller. Furthermore, the method includes generating, by way of the SCSI device, a plurality of command descriptor blocks (CDBs) based on the first information and the second information. Furthermore, the method includes sending, by way of the SCSI device, the plurality of CDBs to the slave controller for transfer of the data between the master controller and the peripheral device. Furthermore, the method includes transferring the data between the master controller and the peripheral device.

BRIEF DESCRIPTION OF DRAWINGS

The above and still further features and advantages of aspects of the present disclosure becomes apparent upon consideration of the following detailed description of aspects thereof, especially when taken in conjunction with the accompanying drawings, and wherein.

To facilitate understanding, like reference numerals have been used, where possible, to designate like elements common to the figures.

DETAILED DESCRIPTION

Figure 1:
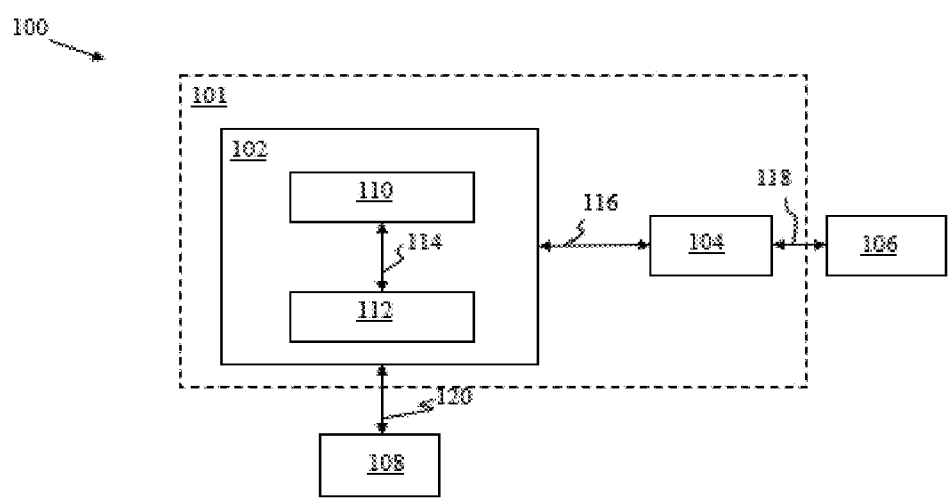
FIG. 1 illustrates a block diagram of an environment for a Small Computer System Interface (SCSI) for transfer of data, in accordance with an exemplary aspect of the present disclosure.

Various aspect of the present disclosure provides a secure device, a system, and a method for hardware small computer system interface. The following description provides specific details of certain aspects of the disclosure illustrated in the drawings to provide a thorough understanding of those aspects. It should be recognized, however, that the present disclosure can be reflected in additional aspects and the disclosure may be practiced without some of the details in the following description.

The various aspects including the example aspects are now described more fully with reference to the accompanying drawings, in which the various aspects of the disclosure are shown. The disclosure may, however, be embodied in different forms and should not be construed as limited to the aspects set forth herein. Rather, these aspects are provided so that this disclosure is thorough and complete, and fully conveys the scope of the disclosure to those skilled in the art. In the drawings, the sizes of components may be exaggerated for clarity.

It is understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

The subject matter of example aspects, as disclosed herein, is described with specificity to meet statutory requirements. However, the description itself is not intended to limit the scope of this patent. Rather, the inventor/inventors have contemplated that the claimed subject matter might also be embodied in other ways, to include different features or combinations of features similar to the ones described in this document, in conjunction with other technologies. Generally, the various aspects including the example aspects relate to a device, a system, and a method depicting a functionality of a small computer system interface (SCSI).

As mentioned, there remains a need for a secure interface to establish connections and data communication between two or more devices, with a dedicated functionality.

The present aspect, therefore: provides a secure device, a system, a method, to establish connections and data communication between two or more devices, with a dedicated functionality.

The aspects herein and the various features and advantageous details thereof are explained more fully with reference to the non-limiting aspects that are illustrated in the accompanying drawings and detailed in the following description. Descriptions of well-known components and processing techniques are omitted so as to not unnecessarily obscure the aspects herein. The examples used herein are intended merely to facilitate an understanding of ways in which the aspects herein may be practiced and to further enable those of skill in the art to practice the aspects herein. Accordingly, the examples should not be construed as limiting the scope of the aspects herein.

FIG. 1 illustrates a block diagram of an environment 100 for a Small Computer System Interface (SCSI) for transfer of data, in accordance with an exemplary aspect of the present disclosure. The environment 100 may include a system 101 for SCSI.

The system 101 may include a SCSI device 102 and a slave controller 104 coupled to each other by way of a second communication bus 116.

In some aspects of the present disclosure, the environment 100 may include the small device 102, the slave controller 104, a peripheral device 106, and a master controller 108 such that the slave controller 104 and the master controller 108 may be communicatively coupled to each other via the SCSI device 102. The peripheral device 106 may be coupled to the slave controller 104 such that the slave controller 104 may communicate instructions and/or data from the peripheral device 106 to the master controller 108 via the SCSI device 102.

The SCSI device 102 may include an initialization unit 110, and a control unit 112 communicatively coupled to each other by way of a first communication bus 114. The initialization unit 110, and the control unit 112 may be implemented on at least one of, a Field Programmable Gate Array (FPGA) and Application Specific Integrated Circuits (ASICs). The initialization unit 112 may be configured to generate a first signal, and may be configured to send the first signal to the slave controller 104. In some aspects of the present disclosure, the first signal may include one or more essential initialization commands. The initialization unit 110 by way of the one or more essential initialization commands may be configured to request the slave controller 104 to share a status of the connection of the peripheral device 106 with the slave controller 104. The initialization unit 110 by way of the one or more essential initialization commands may further be configured to request the slave controller 104 to share a block size of the peripheral device 106. Furthermore, the initialization unit 110 by way of the one or more essential initialization commands may be configured to request the slave controller 104 to share specifications of the peripheral device 106. The specifications of the peripheral device 106 may include, but are not limited, to a class of the peripheral device 106, a capacity of the peripheral device 106, a type of the peripheral device 106, and the like.

The initialization unit 110 may further be configured to receive, from the slave controller 104, first information of a peripheral device 106, in response to the first signal. In some aspects of the present disclosure, the first information may include the status of the connection of the peripheral device 106 with the slave controller 104, the block size of the peripheral device 106, and the specifications of the peripheral device 106.

Furthermore, the initialization unit 110 may be configured to receive, from the master controller 108, second information of the master controller 108. In some aspects of the present disclosure, the second information may include the direction of transfer of the data, the logical bit address of the master controller 108, and the size of data to be transferred. In some aspects of the present disclosure, the initialization unit 110 may be configured to send the first information and the second information to the control unit 112 by way of the first communication bus 114. In some aspects of the present disclosure, the direction of the transfer of the data may include a first direction and a second direction. The first direction may be from the master controller 108 to the peripheral device 106 (i.e., a read instruction), and the second direction may be from the peripheral device 106 to the master controller 108 (i.e., a write instruction).

The control unit 112 may be configured to receive the first information and the second information from the initialization unit 110. The control unit 112 may further be configured to generate a plurality of command descriptor blocks (CDBs), based on the first information and the second information. Furthermore, the control unit 112 may be configured to send the plurality of CDBs to the slave controller 104 for a transfer of data between the master controller 108 and the peripheral device 106. In some aspects of the present disclosure, the control unit 112 may be configured to generate a plurality of read CDBs and the plurality of write CDBs when the direction of the transfer of the data is the first direction and the second direction, respectively. Furthermore, the control unit 112 may be configured to transfer the data between the master controller 108 and the peripheral device 106.

In some aspects of the present disclosure, the slave controller 104 may be coupled to the SCSI device by way of the second communication bus 116. Further, the slave controller 104 may be coupled to the peripheral device 106 by way of a third communication bus 118. In other aspects of the present disclosure, the slave controller 104 may be coupled to more than one peripheral devices by one or more communication buses having a functionality similar to the third communication bus 118.

In some aspects of the present disclosure, the slave controller 104 may be configured to receive the first signal from the SCSI device 102. The slave controller 104 may further be configured to check the status of the connection of the peripheral device 106 with the slave controller 104. Furthermore, the slave controller 104 may request the peripheral device 106 to share the block size of the peripheral device 106, and the specifications of the peripheral device 106. Furthermore, based on the status of the connection of the peripheral device 106 with the slave controller 104, the block size of the peripheral device 106, and the specifications of the peripheral device 106, the slave controller 104 may be configured to generate the first information of the peripheral device 106, and may send the first information of the peripheral device 106 to the SCSI device 102. In some aspects of the present disclosure, the first information may include the status of the connection of the peripheral device 106 with the slave controller 104, the block size of the peripheral device 106, and the specifications of the peripheral device 106. Examples of the peripheral device 106 may include, but are not limited to, a Universal Serial Bus (USB) device, an external Hard Disk Drive (HDD), and the like. Aspects of the present disclosure are intended to include and/or otherwise cover any type of the peripheral device including known, related and later developed technologies without deviating from the scope of the present disclosure.

In some aspects of the present disclosure, the master controller 108 may be coupled to the SCSI device 102 by way of a fourth communication bus 120. The master controller 102 may further be configured to generate the second information, and may be configured to send the second information to the SCSI device 102. In some aspects of the present disclosure, the second information may include the second information may include the direction of transfer of the data, the logical bit address of the master controller 108, and the size of data to be transferred. Examples of the master controller 108 may include, but are not limited to, a general-purpose processor and/or micro-controller, a dedicated processor and/or micro-controller, and the like. Aspects of the present disclosure are intended to include and/or otherwise cover any type of the master controller including known, related and later developed technologies without deviating from the scope of the present disclosure.

Figure 2:
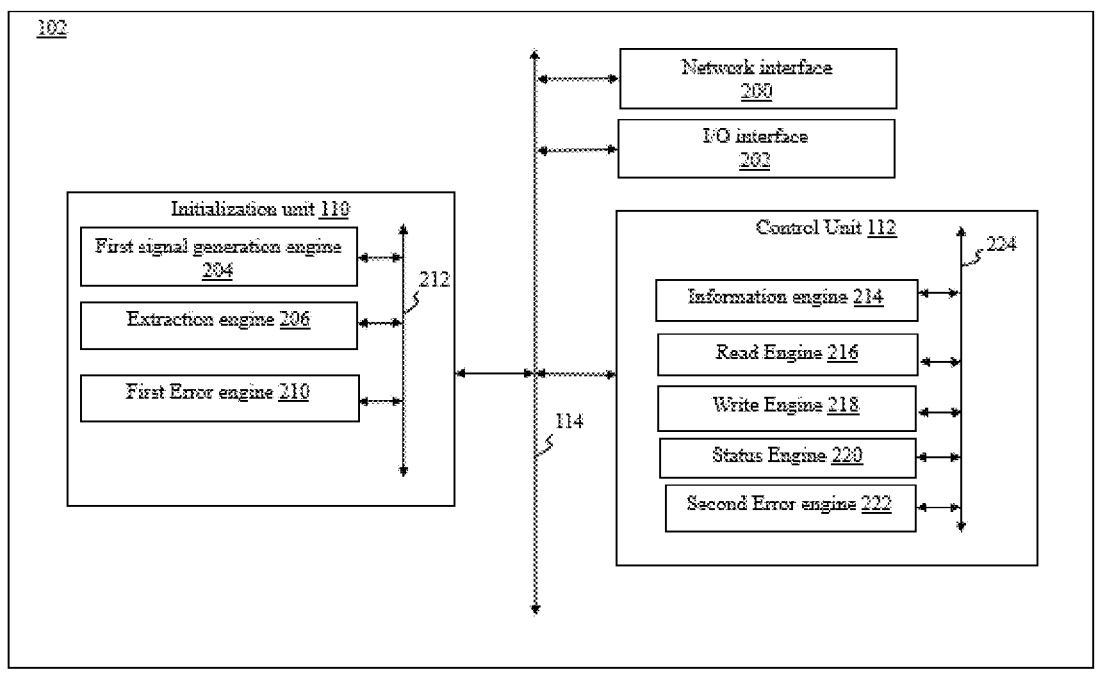
FIG. 2 illustrates a block diagram of a Small Computer System Interface (SCSI) device of FIG. 1, in accordance with an exemplary aspect of the present disclosure.

FIG. 2 illustrates a block diagram of the Small Computer System Interface (SCSI) device 102 of FIG. 1, in accordance with an exemplary aspect of the present disclosure. The SCSI device 102 may include the initialization unit 110, the control unit 112, a network interface 200 and an input/output interface 202 communicatively coupled to each other by way of the first communication bus 114. The initialization unit 110, and the control unit 112 may be implemented on at least one of, a Field Programmable Gate Array (FPGA) and Application Specific Integrated Circuits (ASICs). The network interface 200 may include suitable logic, circuitry, and interfaces that may be configured to establish and enable a communication between the SCSI device 102 and other components of the system 101 (i.e., the slave controller 104, and the master controller 108). The network interface 200 may be implemented by use of various known technologies to support wired or wireless communication of the SCSI device 102 with the other components of the system 101 (i.e., the slave controller 104, and the master controller 108). The I/O interface 202 may include suitable logic, circuitry, interfaces, and/or code that may be configured to receive inputs (e.g., instructions and/or data) and transmit outputs (e.g., instructions and/or data) via a plurality of data ports in the SCSI device 102. The I/O interface 202 may include various input and output data ports for different components of the system 101 (i.e., different port for the slave controller 104, and different port for the master controller 108).

In some aspects of the present disclosure, the initialization unit 110 may include a first signal generation engine 204, an extraction engine 206, and a first error engine 210 communicatively coupled by way of a fourth communication bus 212. The first signal generation engine 204 may be configured to generate the first signal. In some aspects of the present disclosure, the first signal generation engine 204 may generate the one or more essential initialization commands, and may combine the one or more essential initialization commands to generate the first signal to be sent to the slave controller 104. The extraction engine 206 may be configured to receive the first information from the slave controller 104 in response to the first signal. The extraction engine 206 may further be configured to extract the status of the connection of the peripheral device 106 with the slave controller 104, the block size of the peripheral device 106, and the specifications of the peripheral device 106 from the first information. The first error engine 210 may be configured to check a status of the first information and the second information. Further, the first error engine 210 may be configured to generate an error signal, if any one of, the status of the first information, and the status of the second information, is not in accordance with a predefined standard.

In some aspects of the present disclosure, the control unit 112 may include an information engine 214, a read engine 216, a write engine 218, a status engine 220, and a second error engine 222 communicatively coupled to each other by way of a fifth communication 224. The information engine 214 may be configured to receive the second information from the master controller 108. The information engine 214 may further be configured to determine the direction of the transfer of the data, the logical bit address of the master controller 108, and the size of the data to be transferred, based on the second information received from the master controller 108.

Furthermore, the information engine may determine based on the direction of the transfer of the data whether the data is to be transferred from the master controller 108 to the peripheral device 106 (i.e., the read operation) or from the peripheral device 106 to the master controller 108 (i.e., the write operation). The information engine 214, based on the direction of the transfer of the data, may be configured to generate one or more instructions, for one of, the read engine 216 and the write engine 218. The information engine 214, based on the direction of the transfer of the data, may further be configured to send the one or more instructions, for one of, the read engine 216 and the write engine 218, and the second information, to one of, the read engine 216 and the write engine 218.

When the direction of the transfer of the data is the first direction, that is from the master controller 108 to the peripheral device 106 (i.e., the read operation), the read engine 216 may be configured to receive the one or more instructions, and the second information from the information engine 214. In some aspects of the present disclosure, the read engine 216 based on the one or more instructions and/or the second information may be configured to generate the plurality of read command descriptor blocks (CDBs). The read engine 216 may further be configured to send the plurality of read CDBs to the slave controller 104. In some aspects of the present disclosure, the read engine 216 may be configured to receive a third information in response to the read CDBs, based on which, the read engine may initiate the transfer of the data from the master controller 108 and the peripheral device 106.

Else when, the direction of the transfer of the data is the second direction, that is from the peripheral device 106 to the master controller 108 (i.e., the write operation), the write engine 218 may be configured to receive the one or more instructions, and the second information from the information engine 214. The write engine 218 based on the one or more instructions and/or the second information may be configured to generate the plurality of write CDBs. The write engine 218 may further be configured to send the plurality of write CDBs to the slave controller 104. In some aspects of the present disclosure, the write engine 218 may be configured to receive the third information in response to the sent CDBs, based on which, the read engine may initiate the transfer of the data from the master controller 108 and the peripheral device 106. The status engine 220 may be configured to check a status of the transfer of the data between the peripheral device 106 and the master controller 108. The second error engine 222 may be configured to determine one or more errors in the transfer of the data between the peripheral device 106 and the master controller 108. The second error engine 222 may further be configured to determine one or more errors in the generation of the plurality of CDBs by the read engine 216 and/or the write engine 218.

Figure 3:
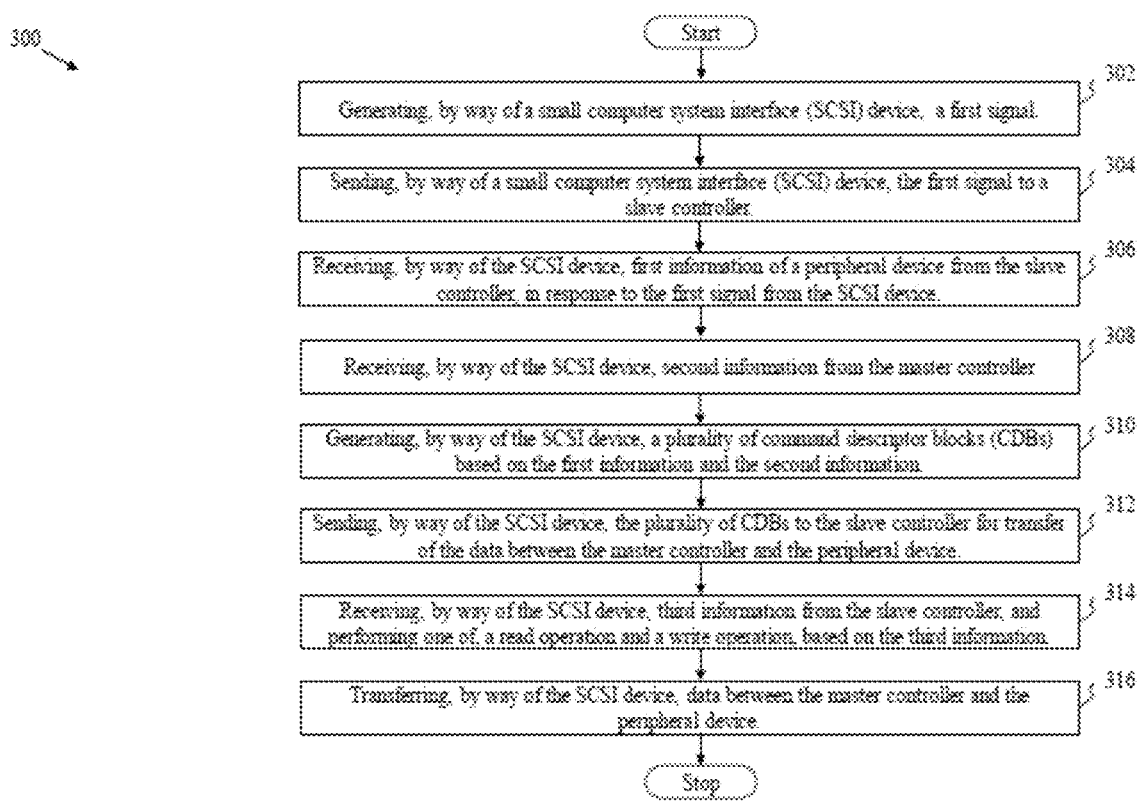
FIG. 3 illustrates a flow chart of a method for the Small Computer System Interface (SCSI) for the transfer of the data, in accordance with an exemplary aspect of the present disclosure.

FIG. 3 illustrates a flow chart of a method for the Small Computer System Interface (SCSI) for the transfer of the data, in accordance with an exemplary aspect of the present disclosure.

At step 302, the system 101, by way of the SCSI device 102, may generate the first signal. In some aspects of the present disclosure, the first signal may include the one or more essential commands.

At step 304, the system 101, by way of the SCSI device 102, may send the first signal to the slave controller 104.

At step 306, the system 101, by way of the SCSI device 102, may receive the first information of the peripheral device 106 from the slave controller 104, in response to the first signal from the SCSI device 102. In some aspects of the present disclosure, the first information may include the status of the connection of the peripheral device 106 with the slave controller 104, the block size of the peripheral device 106, and the specifications of the peripheral device 106.

At step 308, the system 101, by way of the SCSI device 102, may receive the second information from the master controller 108. In some aspects of the present disclosure, the second information may include the direction of transfer of the data, the logical bit address of the master controller 108, and the size of data to be transferred.

At step 310, the system 101, by way of the SCSI device 102, may generate the plurality of command descriptor blocks (CDBs) based on the first information and the second information. In some aspects of the present disclosure, the system 101 by way of the SCSI device 102, based on the direction of the transfer of the data, may be configured to generate the plurality of CDBs. In some aspects of the present disclosure, the direction of the transfer of the data may include the first direction and the second direction. The first direction may be from the master controller 108 to the peripheral device 106 (i.e., a read instruction), and the second direction may be from the peripheral device 106 to the master controller 108 (i.e., a write instruction). In some aspects of the present disclosure, the system 101 by way of the SCSI device 102 may be configured to generate a plurality of read CDBs if the direction of the transfer of the data is the first direction. In some aspects of the present disclosure, the system 101 by way of the SCSI device 102 may be configured to generate a plurality of write CDBs if the direction of the transfer of the data is the second direction. In some aspects of the present disclosure, the system 101 by way of the SCSI device 102 may determine one or more errors in the generation of the plurality of CDBs At step 312, the system 101, by way of the SCSI device 102, may send the plurality of CDBs to the slave controller 104 for transfer of the data between the master controller 108 and the peripheral device 106.

At step 314, the system 101, by way of the SCSI device 102, may receive the third information from the slave controller, and performing one of, a read operation and a write operation, based on the third information. In some aspects of the present disclosure, the system 101 by way of the SCSI device 102, may be configured to determine one or more errors in the transfer of the data between the peripheral device 106 and the master controller 108.

At step 316, the system 101, by way of the SCSI device 102, may transfer the data between the master controller 108 and the peripheral device 106.

The implementation of the initialization unit 110 and the control unit 112 by the at least one of, a Field Programmable Gate Array (FPGA) and Application Specific Integrated Circuits (ASICs) may result in advantages such as secure interface to establish connections and data communication between two or more devices, and the like. As will be readily apparent to those skilled in the art, aspects of the present disclosure may easily be produced in other specific forms without departing from their essential characteristics. Aspects of the present disclosure are, therefore, to be considered as merely illustrative and not restrictive, the scope being indicated by the claims rather than the foregoing description, and all changes which come within therefore intended to be embraced therein.

The foregoing discussion of the present disclosure has been presented for purposes of illustration and description. It is not intended to limit the present disclosure to the form or forms disclosed herein. In the foregoing Detailed Description, for example, various features of the present disclosure are grouped together in one or more aspects, configurations, or aspects for the purpose of streamlining the disclosure. The features of the aspects, configurations, or aspects may be combined in alternate aspects, configurations, or aspects other than those discussed above. This method of disclosure is not to be interpreted as reflecting an intention the present disclosure requires more features than are expressly recited in each claim. Rather, as the following claims reflect, inventive aspects lie in less than all features of a single foregoing disclosed aspect, configuration, or aspect. Thus, the following claims are hereby incorporated into this Detailed Description, with each claim standing on its own as a separate aspect of the present disclosure.

Moreover, though the description of the present disclosure has included description of one or more aspects, configurations, or aspects and certain variations and modifications, other variations, combinations, and modifications are within the scope of the present disclosure, e.g., as may be within the skill and knowledge of those in the art, after understanding the present disclosure. It is intended to obtain rights which include alternative aspects, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

As one skilled in the art will appreciate, the system 101 includes a number of functional blocks in the form of a number of units and/or engines. The functionality of each unit and/or engine goes beyond merely finding one or more computer algorithms to carry out one or more procedures and/or methods in the form of a predefined sequential manner, rather each engine explores adding up and/or obtaining one or more objectives contributing to an overall functionality of the system 101. Each unit and/or engine may not be limited to an algorithmic and/or coded form, rather may be implemented by way of one or more hardware elements operating together to achieve one or more objectives contributing to the overall functionality of the system 101. Further, as it will be readily apparent to those skilled in the art, all the steps, methods and/or procedures of the system 101 are generic and procedural in nature and are not specific and sequential.

Certain terms are used throughout the following description and claims to refer to particular features or components. As one skilled in the art will appreciate, different persons may refer to the same feature or component by different names. This document does not intend to distinguish between components or features that differ in name but not structure or function. While various aspects of the present disclosure have been illustrated and described, it will be clear that the present disclosure is not limited to these aspects only. Numerous modifications, changes, variations, substitutions, and equivalents will be apparent to those skilled in the art, without departing from the spirit and scope of the present disclosure, as described in the claims.

What is claimed is:

1. A small computer-system interface (SCSI) device (102) comprising:
   an initialization unit (110) configured to (i) send a first signal to a slave controller (104), (ii) receive, from the slave controller (104), first information of a peripheral device (106) in response to the first signal, wherein the first information comprising a status of a connection of the peripheral device (106) with the slave controller (104), a block size of the peripheral device (106), and specifications of the peripheral device (106), and (iii) receive second information from a master controller (108), wherein the second information comprising a direction of the transfer of the data, a logical bit address of the master controller (108), and a size of the data to be transferred; and
   a control unit (112) that is coupled to the initialization unit (110), and configured to (i) generate a plurality of command descriptor blocks (CDBs) based on the first information and the second information, (ii) send the plurality of CDBs to the slave controller (104) for a transfer of data between the master controller (108) and the peripheral device (106), and (iii) transfer the data between the master controller (108) and the peripheral device (106);
   wherein, the initialization unit (110) and the control unit (112) are implemented on at least one of, a Field Programmable Gate Array (FPGA) and Application Specific Integrated Circuits (ASICs).

2. The SCSI device (102) as claimed in claim 1, wherein the direction of the transfer of the data comprising a first direction and a second direction.

3. The SCSI device (102) as claimed in claim 2, wherein the plurality of CDBs comprising a plurality of read CDBs and a plurality of write CDBs, wherein the control unit (112) is configured to generate the plurality of read CDBs and the plurality of write CDBs when the direction of the transfer of the data is the first direction and the second direction, respectively.

4. A system (101) comprising:
   a slave controller (104); and
   a small computer system interface (SCSI) device (102) comprising:
   an initialization unit (110) configured to (i) send a first signal to the slave controller (104), (ii) receive, from the slave controller (104), first information associated with a peripheral device (106) in response to the first signal, wherein the first information comprising a status of a connection of the peripheral device (106) with the slave controller (104), a block size of the peripheral device (106), and specifications of the peripheral device (106), (iii) receive, second information from the master controller (108), wherein the second information comprising a direction of the transfer of the data, a logical bit address of the master controller (108), and a size of the data to be transferred; and
   a control unit (112) that is coupled to the initialization unit (110), and configured to (i) generate a plurality of command descriptor blocks (CDBs) based on the first information and the second information, and (ii) send the plurality of CDBs to the slave controller (104) for a transfer of data between the master controller (108) and the peripheral device (106), and (iii) transfer the data between the master controller (108) and the peripheral device (106);
   wherein, the initialization unit (110) and the control unit (112) are implemented on at least one of, a Field Programmable Gate Array (FPGA) and Application Specific Integrated Circuits (ASICs).

5. The system (101) as claimed in claim 4, wherein the direction of the transfer of the data comprising a first direction and a second direction.

6. The system (101) as claimed in claim 5, wherein the plurality of CDBs comprising a plurality of read CDBs and a plurality of write CDBs, wherein the control unit (112) is configured to generate the plurality of read CDBs and the plurality of write CDBs when the direction of the transfer of the data is the first direction and the second direction, respectively.

7. A method (300) comprising:
   sending, by way of an initialization unit (110) of a small computer system interface (SCSI) device (102), a first signal to a slave controller (104);
   receiving, by way of the initialization unit (110) of the SCSI device (102), first information of a peripheral device (106) from the slave controller (104), wherein the first information comprising a status of a connection of the peripheral device (106) with the slave controller (104), a block size of the peripheral device (106), and specifications of the peripheral device (106);

receiving, by way of the initialization unit (110) of the SCSI device (102), second information from a master controller (108), wherein the second information comprising a direction of the transfer of the data, a logical bit address of the master controller (108), and a size of the data to be transferred;

generating, by way of a control unit (112) of the SCSI device (102) that is coupled to the initialization unit (110), a plurality of command descriptor blocks (CDBs) based on the first information and the second information; and sending, by way of the control unit (112) of the SCSI device (102), the plurality of CDBs to the slave controller (104) for transfer of the data between the master controller (108) and the peripheral device (106); and transferring, by way of the control unit (112) of the SCSI device (102), the data between the master controller (108) and the peripheral device (106);

wherein, the initialization unit (110), and the control unit (112) are implemented on at least one of, a Field Programmable Gate Array (FPGA) and Application Specific Integrated Circuits (ASICs).

8. The method (300) as claimed in claim 7, wherein the direction of the transfer of the data comprising a first direction and a second direction.

9. The method (300) as claimed in claim 8, wherein the plurality of CDBs comprising a plurality of read CDBs and a plurality of write CDBs, wherein the control unit (112) is configured to generate the plurality of read CDBs and the plurality of write CDBs when the direction of the transfer of the data is the first direction and the second direction, respectively.

* * * * *